March 20, 1962
B. E. KNIGHT
3,026,157
MEANS FOR MINIMISING RISK OF SEIZURE OF
ROTARY SPINDLES IN BEARINGS
Filed Sept. 23, 1959
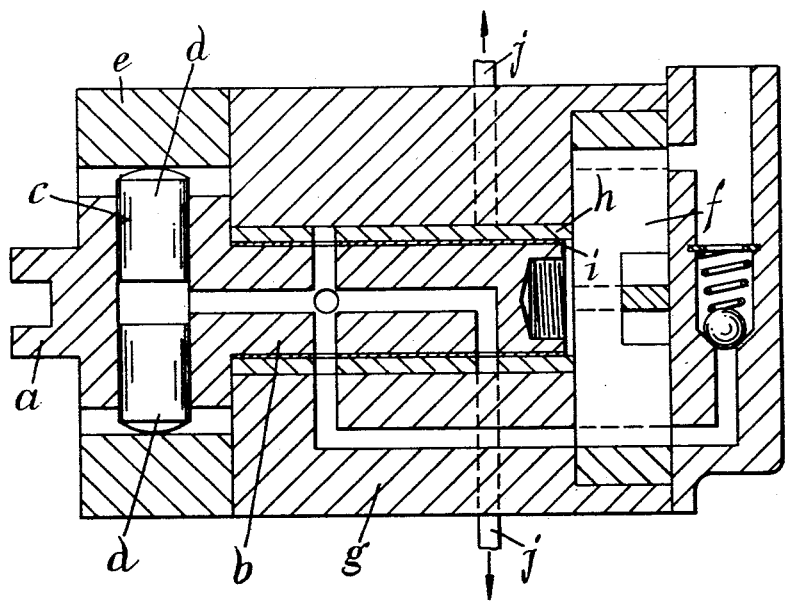
Inventor
B. E. Knight United States Patent Office 3,026,157
Patented Mar. 20, 1962

3,026,157
MEANS FOR MINIMISING RISK OF SEIZURE OF ROTARY SPINDLES IN BEARINGS
Basil Edward Knight, Eastcote, Pinner, England, assignor to C. A. V. Limited, Acton, London, England
Filed Sept. 23, 1959, Ser. No. 841,805
1 Claim. (Cl. 308—237)

A known type of liquid fuel injection pump for internal combustion engines comprises a rotary spindle at one end of which is formed or secured a pumping head. A typical example of such a pump is illustrated diagrammatically by the accompanying drawing. The head $a$ at one end of the spindle $b$ has formed in it a transverse bore $c$ containing at least one reciprocatory plunger $d$ which is actuated by a stationary annular cam $e$ surrounding the head. At the other end of the spindle may be formed or secured the impeller $f$ of a rotary feed pump by which fuel is supplied to the said head. The spindle $b$ is supported in a closely fitting bore in the stationary housing $g$ of the pump, and in the spindle and housing are formed passages as shown by which the fuel is conveyed from the feed pump to the head of the injection pump, and from the latter to delivery passages $j$ in the housing.

It has been found that after such a pump when cold has been set in motion, a condition is sometimes set up in which a liability occurs for the spindle to become seized in the bore of the housing, with consequent abrasion of the spindle or bore or both. Experience suggests that this condition is attributable to unequal rates of expansion of the spindle and housing with increasing temperature, causing the necessarily small clearance between the spindle and bore to be reduced, and metallic contact to occur between the surfaces of the parts mentioned.

The primary object of the invention is to enable the said risk of seizure to be minimised or obviated in a simple and reliable manner, but the invention is also applicable to other mechanisms where a like condition exists.

According to the invention the spindle $b$ is enclosed by a thin steel sleeve $h$ which is shrunk on to, that is to say, mounted in tension on, a thin rigid layer $i$ of a synthetic plastic which is of low thermal conductivity.

In one example of the invention as applied to the spindle of a fuel injection pump as above described, there is deposited on the spindle a thin rigid layer $i$ of a synthetic plastic which is of low thermal conductivity, the material known by the registered trademark Araldite being suitable for this purpose. The thickness of the layer $i$ is about one tenth of a millimetre. On to this layer is shrunk, that is to say, mounted in tension, a nitrided or other hard steel sleeve $h$ of about two millimetres thickness, which sleeve closely fits the bore in the housing $g$.

As already stated the invention is also applicable in like manner to other analogous uses, where a spindle is supported in a closely fitting bore in a bearing.

By the combination with the spindle of a sleeve and intermediate layer as above described it has been found that risk of seizure can be reliably obviated. Thus, the thin rigid layer $i$ of synthetic plastic constitutes thermal insulation which, when heat is generated between the contiguous cylindrical surfaces of the rotary sleeve $h$ and the housing $g$, ensures that the spindle $b$ remains cooler than the sleeve and the adjacent part of the housing. Moreover, due to the fact that the sleeve $h$ is mounted in tension on the layer $i$ of synthetic plastic, which minimises radial flow through the sleeve, heat generated between the above mentioned cylindrical surfaces merely reduces the tension in the sleeve, and does not cause radial expansion thereof. Consequently, the clearance between the sleeve $h$ and the bore in the housing $g$, is unaffected by the above mentioned generated heat, with the result that risk of seizure of the sleeve in the housing is effectively minimised.

Having thus described my invention what I claim as new and desire to secure by Letters Patent is:

Means for minimising risk of seizure of a rotary spindle in a bearing bore, comprising in combination with the rotary spindle and a stator having the bearing bore formed therein, a thin rigid layer of synthetic plastic deposited on and surrounding the spindle, and a thin steel sleeve mounted in tension on the said layer and closely fitting the bearing bore, the said synthetic plastic having low thermal conductivity so that the layer thereof constitutes thermal insulation between the spindle and sleeve.

References Cited in the file of this patent

UNITED STATES PATENTS

| 1,908,743 | Farrell | May 16, 1933 |
| 2,295,873 | Stone | Sept. 15, 1942 |
| 2,324,676 | Butterfield | July 20, 1943 |
| 2,608,451 | Pierce | Aug. 26, 1952 |
| 2,714,538 | Hornbostel | Aug. 2, 1955 |